United States Patent [19]

Berkeley et al.

[11] Patent Number: 5,161,606
[45] Date of Patent: Nov. 10, 1992

[54] INTERACTIVE ELECTRONIC THERMOSTAT WITH MINIMUM AND MAXIMUM TEMPERATURE THERMAL LIMIT SWITCHES

[75] Inventors: Arnold D. Berkeley, Potomac, Md.;
Alec Bernstein, Pasadena, Calif.;
Donald E. Jefferson, Silver Spring;
Daniel C. Carney, Baltimore, both of Md.;

[73] Assignee: Arnold D. Berkeley, Potomac, Md.

[21] Appl. No.: 750,085

[22] Filed: Aug. 27, 1991

Related U.S. Application Data

[63] Continuation-in-part of Ser. No. 282,319, Dec. 9, 1988, Pat. No. 5,065,813.

[51] Int. Cl.$^5$ ............... F25B 29/00; F25B 49/00
[52] U.S. Cl. ........................... 165/1; 165/11.1; 165/12; 165/26; 236/94; 236/46 R
[58] Field of Search ............ 165/12, 1, 11.1, 26; 236/94, 47, 46 R

[56] References Cited

U.S. PATENT DOCUMENTS

| | | | |
|---|---|---|---|
| 4,431,134 | 2/1984 | Hendricks et al. | 236/46 R |
| 4,725,001 | 2/1988 | Carney et al. | 236/46 R |
| 5,065,813 | 11/1991 | Berkeley et al. | 236/94 |

*Primary Examiner*—John K. Ford
*Attorney, Agent, or Firm*—Beveridge, DeGrandi & Weilacher

[57] ABSTRACT

An interactive electronic thermostat operates to communicate with an installer through an audible or visual display and keypad to instruct the installer to perform tasks and enter observations to effect proper connections at the thermostat of heater/air conditioner wires in spite of the absence of labels identifying the functions of those wires. The thermostat requires entry of coded indicia representing operator-observed conditions in the system in response to displayed instructions carried out by the operator. Control circuits are automatically assigned functional tasks in response to the operator-observed conditions entered into the system. Different program routines are invoked depending upon the number of system wires and the type of heater/air conditioner being controlled. Under appropriate circumstances, messages are displayed informing the operator/homeowner that the thermostat is incompatible, or has no advantageous use, with the heater/air conditioner. In one embodiment the installer need only connect the wires to the thermostat terminals one time; the thermostat configures its internal connection paths in response to installer-entered indicia to assure proper control of the system. Another embodiment incorporates a safety backup system to automatically activate the HVAC system in the event that normal operation of the thermostat is interrupted and the temperature in the conditioned area falls or rises beyond a predetermined range.

11 Claims, 9 Drawing Sheets

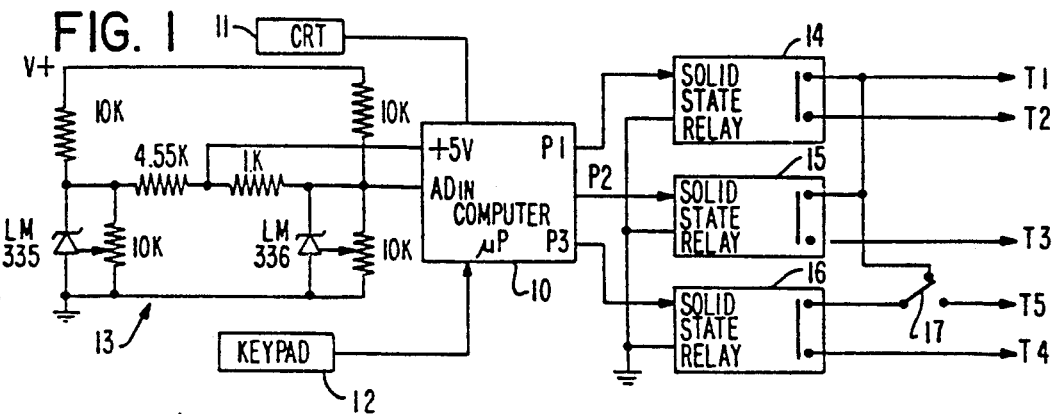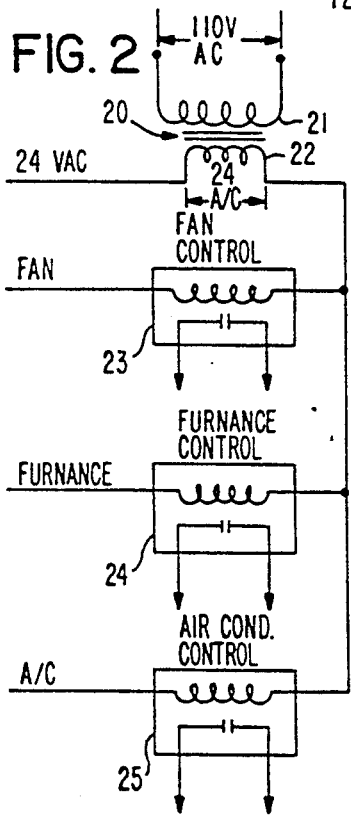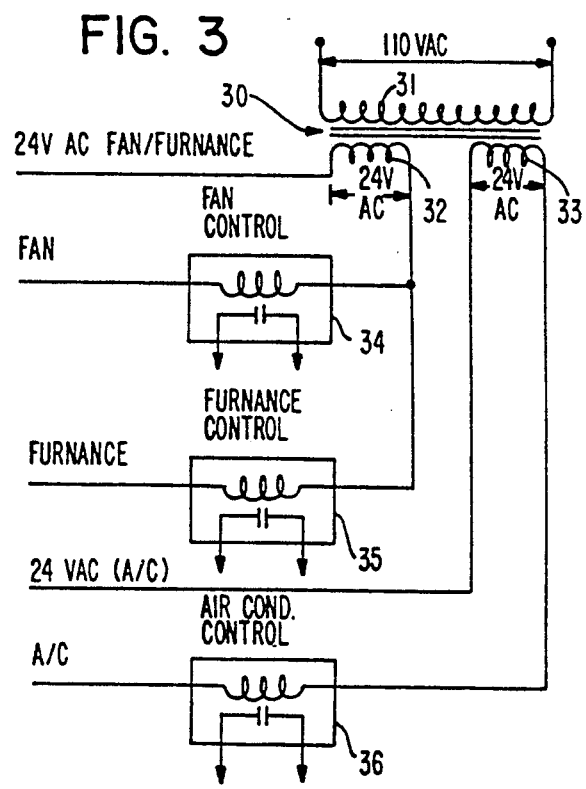

INTERACTIVE ELECTRONIC THERMOSTAT WITH MINIMUM AND MAXIMUM TEMPERATURE THERMAL LIMIT SWITCHES

BACKGROUND OF THE INVENTION

This application is a continuation-in-part of application Ser. No. 07/282,319 filed on Dec. 9, 1988, and now issued as U.S. Pat. No. 5,065,813.

1. Technical Field

The present invention relates to electronic thermostats for heating/cooling systems and, more particularly, to thermostats employing a user-interactive microprocessor controlled by unique software to facilitate installation and user interaction.

2. Discussion of the Prior Art

A specific embodiment of the invention described in application Ser. No. 07/282,319 filed Dec. 9, 1988, now issued as U.S. Pat. No. 5,065,813, is disclosed in the context of the heating/cooling system that is the subject of our U.S. Pat. No. 4,725,001, issued Feb. 16, 1988, the disclosure of which is expressly incorporated herein. The disclosure in our U.S. Pat. No. 5,065,813 issued on Nov. 19, 1991 likewise is expressly incorporated herein.

There are numerous electronic thermostats known in the prior art, some of which are disclosed in U.S. Pat. Nos. 4,172,555 (Levine '555): 4,199,023 (Phillips): 4,206,872 (Levine '872): 4,356,962 (Levine '962): 4,408,711 (Levine '711): 4,460,123 (Beverly): 4,469,274 (Levine '274); and 4,473,183 (Kensinger et al). Some of these electronic thermostats include microprocessors controlled by specifically formulated software designed to effect intended heating/cooling system operation. Specifically, the aforementioned Beverly patent discloses a thermostat utilizing a microprocessor. All prior art electronic thermostats have been difficult for the average homeowner to install, particularly when replacing a thermostat in a pre-existing HVAC system. In particular, the wires of an existing system are not labeled as to function, (i.e., burner, fan, air conditioner, voltage supply, etc.) and it is quite likely that the wires can be improperly connected, possibly causing damage to system equipment. Consequently, the installation of prior art electronic thermostats, has required trained personnel to avoid damage to the system.

In addition, when a thermostat is replaced in a pre-existing HVAC system, it is possible that the new thermostat will be incompatible with the pre-existing system. For example, in the case of the HVAC system described in our aforementioned U.S. Pat. No. 4,725,001, the system utilizes a unique cycling arrangement of on-time and pause intervals. That particular cycling arrangement may not be compatible with heat pumps or with certain types of boiler heating units, namely: (1) steam radiator heating systems: or (2) any boiler in which the fluid is heated by an immersion type heater such that the fluid temperature and fluid circulation are separately controlled. Under such circumstances the homeowner/operator must be made aware of the incompatibility and must be instructed to either have the system modified or to return the thermostat to the place of purchase.

OBJECTS AND SUMMARY OF THE INVENTION

It is therefore an object of the present invention to provide a method and apparatus for facilitating installation of an interactive electronic thermostat such that improper connections and resulting damage are virtually eliminated. In this regard, an interactive electronic thermostat is any thermostat that permits interaction between the thermostat and the installer or user.

Installation of a thermostat in accordance with one embodiment of the present invention is achieved with the aid of instructional software arranged to successively prompt the homeowner by visual or audible prompts, in his native language (e.g., English), to make certain connections and to actuate certain equipment. Likewise, the prompting provided by the software during the entry of set points into the system is in the native language of the system user. Control circuits in the thermostat are assigned appropriate functions depending on the user's responses. In addition, the software requests certain information from the homeowner in order to determine whether or not the pre-existing HVAC system is compatible with the thermostat being installed.

In a second embodiment of the invention, interactive software permits the user to connect the wires of the HVAC system to any thermostat terminal. The system automatically determines the function of each wire and connects the thermostat control circuits to the appropriate thermostat terminals accordingly.

In another embodiment, an auxiliary device is provided to maintain the temperature in a conditioned space within a predetermined range independently of the main temperature controlling device. The auxiliary device thus provides a safety back-up system in the event of failure of the main device. The interactive software likewise instructs the installer on how to connect the auxiliary device.

BRIEF DESCRIPTION OF THE DRAWINGS

The above and still further objects, features and advantages of the present invention will become apparent upon consideration of the following detailed description of preferred embodiments thereof, especially when taken in conjunction with the accompanying drawings, wherein like reference numerals in the various figures are utilized to designate like components, and wherein:

FIG. 1 is a schematic diagram of the interactive electronic thermostat of the present invention including the inter-connections between the microprocessor and the temperature sensor, and between the microprocessor and the HVAC system;

FIG. 2 is a schematic diagram of a conventional four-wire forced air HVAC system to which the circuit of FIG. 1 can be connected in accordance with the present invention;

FIG. 3 is a schematic diagram of a conventional five-wired forced air HVAC system to which the circuit of FIG. 1 can be connected in accordance with the present invention;

FIG. 4 is a schematic diagram of a lamp circuit employed in the process of connecting the circuit of FIG. 1 to the circuit of FIG. 3;

DESCRIPTION OF THE PREFERRED EMBODIMENTS

Figure 5:
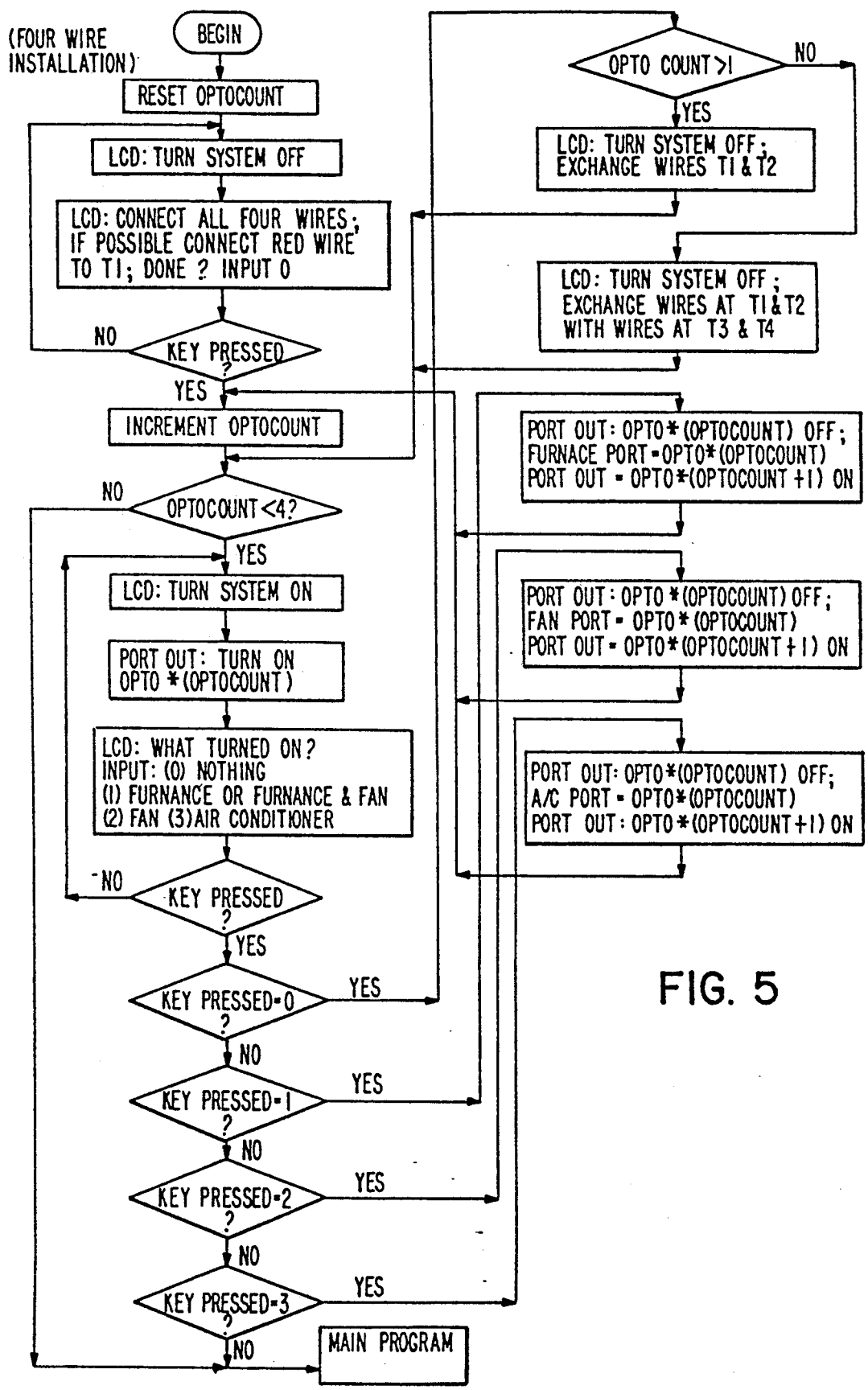
FIG. 5 illustrates the program routine for interaction with the system user to instruct proper connection of the thermostat to a four-wire HVAC system such as illustrated in FIG. 3.

The electronic thermostat of the present invention is illustrated schematically in FIG. 1 of the accompanying drawings to which specific reference is now made. The thermostat includes a microprocessor 10, a display unit 11, a keypad 12, circuitry 13 for providing a measured temperature-indicative signal to the microprocessor, and solid state relays 14, 15 and 16 for connecting the microprocessor to the HVAC system. Microprocessor 10 may be any commercially available microprocessor or the equivalent (e.g., programmable logic array, application-specific integrated chip, etc.) capable of functioning in a manner consistent with the description set forth herein. In a prototype version of the invention which has been constructed and tested, a Commodore Model 64 computer was utilized for microprocessor 10; a Hewlett Packard Model HP-871 is also suitable. Display unit 11 may be any cathode ray tube (CRT) display unit compatible with the particular microprocessor employed. Alternatively, a light emitting diode or liquid crystal display unit may be employed. Keypad 12 may also be any input keypad (or keyboard) device compatible with the microprocessor. It will also be appreciated that the various prompts described below may be audible, rather than visual prompts such as might be effected by voice simulation. Likewise, voice input may be employed in place of a keypad if the thermostat is equipped with a voice recognition capability.

The temperature indication circuit 13 is the Fahrenheit Thermometer Application Circuit illustrated in the National Semi-Conductor Linear Databook, 1982 edition, at page 9-29. That circuit provides an accurately calibrated analog signal representative of the ambient temperature, in degrees Fahrenheit, to which the precision temperature sensor LM 335 (National Semi-Conductor Corporation) is exposed. Typically, the precision temperature sensor is disposed in a room, home, or other space to be heated and/or cooled by the system controlled by the thermostat of the present invention. Circuit 13 includes a voltage reference diode LM 336 (National Semiconductor Corporation) connected as a 2.5 volt reference having a temperature coefficient that is independent of its breakdown voltage. The temperature indicative output signal from circuit 13 is connected to the analog-to-digital converter input port of computer 10. Power for the circuit is provided from the +5 volt supply terminal of the computer. It will be understood that the particular circuit 13 illustrated in FIG. 1 is only one example of many temperature responsive circuits that may be employed with the present invention.

The solid state relays 14, 15 and 16 are respective control circuits serving to connect the computer 10 to the HVAC system via system wires at terminals T1, T2, T3 and T4, in the case of a four-wire system, or at terminals T1, T2, T3, T4 and T5, in the case of a five-wire system. Solid state relays 14, 15 and 16 are preferably opto-isolators, such as Opto 22 Model MP 120 D2, and are selectively energizeable by computer 10, under software control, to close circuit contacts connected to the system wires. Any other control circuits capable of providing the functions described herein may be used in place of the preferred opto-isolators. In the illustrated embodiment the energizing input circuit for each solid state relay is referenced to ground, relay 14 is energized via computer output port P1, relay 15 is energized via computer output port P2, and relay 16 is energized via computer output port P3.

The solid state relays are employed as part of the feature of the present invention which permits foolproof proper connection of the thermostat terminals to the wires of the HVAC system during installation. To this end, one side of the contact for each of relays 14 and 15 is connected to terminal T1; the same side of the contact for relay 16 is connected through a switch 17 to terminal T1 when switch 17 is in its illustrated position. Switch 17 is placed in the illustrated position by the installer when the heating/cooling system is a four-wire system; the switch is placed in its other position when a five-wire system configuration is being served by the thermostat. Five-wire systems are typically used when the air conditioner has a voltage supply transformer that is separate and apart from the heating system supply transformer. The other side of the contacts for relays 14, 15 and 16 are connected to terminal T2, T3 and T4, respectively. Switch 17 connects terminal T5 to the first-mentioned side of the contact of relay 16 for the five-wire system.

FOUR-WIRE INSTALLATION

A typical and conventional four-wire HVAC system is illustrated schematically in FIG. 2 to which specific reference is now made. Primary power, typically 110 volts, 60 Hz, is applied across the primary winding 21 of a transformer 20 and is stepped down to 24 volts across secondary winding 22. A 24 V AC line is one of the four-wires of the system to be connected to the thermostat and is derived from one side of secondary winding 22. The other side of the secondary winding is connected to one side of each of three relay coils for the fan control relay 23, the furnace control relay 24 and the air conditioner control relay 25, respectively. The opposite sides of these three relay coils are the Fan, Furnace, and A/C wires constituting the other three wires of the four system wires. It will be appreciated that when the 24 V AC line is connected to any or all of the other three wires via solid state relays 14, 15, 16 (FIG. 1), the relays associated with those wires are energized thereby to close the contacts associated with the energized relay and turn on the appropriate function (i.e., fan, furnace, air conditioner).

In order for the thermostat to operate, it is important that the 24 V AC line be connected at terminal T1 (FIG. 1) which contacts one side of each of the solid state relays 14, 15 and 16. The Fan, Furnace and A/C lines are connected to the other sides of respective relays so that energization of each relay effects the appropriate furnace function. Connection of any two lines other than the 24 V AC line to a relay precludes operation of the functions associated with those lines. Since the wires from the furnace are not labeled by function and are, more often than not, uncoded, it is unlikely that the 24V AC line will be connected to the T1 terminal by mere chance. Consequently, the software stored in computer 10 is provided with an interactive installation program or routine for a four-wire system. The flow chart for that program is illustrated in FIG. 5 to which specific reference is made in the following discussion.

Entry into the four-wire installation routine maybe initiated by the entry of a particular combination of digits from keypad 12 (FIG. 1) that is recognized by the computer as a request to begin a four-wire installation procedure. The particular combination of numbers to be entered would typically be described in the installation instructions provided with the thermostat. (A different number combination code would be required for entry into a five-wire installation procedure under the control of the software routine illustrated in FIG. 6 or a boiler installation procedure under the control of the software routine illustrated in FIG. 7). For the four-wire installation, a parameter designated "Optocount" is established and represents, at any time, one of the solid state relays 14, 15, 16, or none of these relays. At the start of the procedure the Optocount is reset and the installer is instructed, at display 11, to turn the HVAC system off. This, and all other displayed instructions, appear or are audibly rendered in the English language or other national language of the country in which the system is installed. After the system has been turned off, as would typically be signified by the actuation of a key at the keypad 12, the installer is instructed to connect all four wires from the heating/cooling system to respective terminals T1 through T4. The instruction indicates that the red wire, if any, should be connected to T1 since red is often used to code the hot or power wire and may, therefore, be the 24 V AC line. In any event, after all four wires are connected, irrespective of whether or not they are correctly connected by function, the installer is instructed to depress the O key at keypad 12. When this has been done the Optocount is incremented by one count to a count of one to represent port P1 and solid state relay 14. Since at this time the Optocount is less than four, the installer is instructed to turn the system on. In addition, the output port (in this case P1) of computer 10 corresponding to the Optocount delivers a signal to energize the solid state relay associated with that Optocount. In other words, solid state relay 14 is energized. The installer is then asked to indicate, by depression of an appropriate key at keypad 12, what occurred by virtue of the system having been turned on and solid state relay 14 having been energized. With relay 14 energized, terminals T1 and T2 are shorted together. If one of the four lines connected to T1 or T2 is the 24 V AC line, either the fan, the furnace or the air conditioner will be activated by the energization of relay 14 since the other connected line will be the FAN, FURNACE, or A/C line. If the installer depresses a "0", signifying that neither the fan, the furnace nor the air conditioner was activated, the Optocount is examined to determine whether or not it exceeds a value of one. Since, under the assumed conditions, the Opto-count is equal to one, the result of the examination is negative. The program then instructs the installer to exchange the wires connected at T1 and T2 with the wires connected at T3 and T4 the installer is also instructed to turn the system off. Following this the software then loops back to repeat the previous steps beginning with a determination as to whether or not the Optocount is less than four. This time, however, one of the two leads connected to T1 and T2 will be the 24 V AC lead so that the installer, after turning the system back on, enters either "1" (signifying that the furnace or furnace and fan have been energized), "2" (signifying that the fan only has been energized), or "3" (signifying that the air conditioner has been energized). The software then makes one or more inquiries to determine which of the keys has been pressed by the installer. Assuming that the installer presses the "1" key, the computer output port corresponding to the Optocount is deactivated to de-energize the corresponding solid state relay (in this case relay 14). Since the "1" key indicated that the furnace had been energized, the computer port corresponding to the Optocount (namely P1) is designated as the furnace port; accordingly, relay 14 is assigned the function of controlling operation of the furnace. The next output port P2, corresponding to Optocount plus one, is then activated to energize solid state relay 15. The software then loops back to the point in the loop where the Optocount is incremented.

With the Optocount now at a value of two, the procedure repeats so that the installer is once again requested to enter a numeral corresponding to what is observed when the system is turned on. At this time, since the 24 V AC and FURNACE lines are connected at T1, T2, the only possibilities when the system is turned on are that nothing happened, or the fan was energized, or the air conditioner was energized. The possibility of nothing happening occurs only when the 24 V AC line is connected to T2 rather than T1, the latter being tied to one side of each of the relays 14, 15 and 16. Assuming this to be the case, a "0" is entered by the installer and, since the Optocount is greater than one, the installer is prompted by the display to exchange the two wires at T1 and T2. At this point in time the 24 V line is properly connected to T1 and the FURNACE line is connected to T2. Further, the FAN and A/C lines are connected at T3 and T4, although not necessarily in that order. The software now loops back to the point where the determination is made as to whether or not the Optocount is less than four.

Once again the installer is prompted to turn the system on and the computer output port (P2) corresponding to the current Optocount is activated, thereby energizing solid state relay 15. Only two possibilities now remain, depending on whether the FAN or A/C line is connected to T3. If the FAN line is so connected, a "2" will be pressed by the installer and detected by the system. As a result the P2 output port of computer 10, corresponding to the current Optocount, is deactivated and designated as the fan port, thereby assigning to relay 15 the function of controlling fan operation. The P3 port, corresponding to a value of the Optocount plus one, is activated to energize relay 16. The software then loops back to the point at which the Opto-count is incremented to a value of three and output for P3 is activated.

After the system is turned on, the only remaining possibility is that the air conditioner is energized, in response to which the installer enters the numeral "3" via keypad 12. Relay 16, therefore, must be assigned the task of controlling air conditioner operation. Accordingly, the software deactivates the P3 port, designates that port as the air conditioner port and activates the computer port corresponding to output port plus one. This port is not connected to the system so that no effect is observed. The software loops back to the point at which the Optocount is incremented and a determination is now made that the Optocount is not less than four; in fact, the Optocount is equal to four. Under these circumstances the system recognizes completion of the installation procedure and directs the program to the Main Program described in our aforementioned U.S. Pat. No. 4,725,001 or to an appropriate point in other programs utilized in any other electronic set back or set forward thermostat.

From the foregoing it will be appreciated that the concept behind the four-wire installation procedure is that the first relay 14 is energized and the installer is required to inform the system as to which of the fan, furnace or air conditioner has been energized. If one of these is energized, the activated port is designated by the system a the port dedicated to the energized component, and the corresponding relay is assigned to control that component. If nothing is energized the system recognizes that the 24 V AC line has not been connected at T1 or T2 and therefore requires that the pair of wires at T1 and T2 be exchanged with the pair of wires at T3 and T4. Under such circumstances on of the fan, furnace and air conditioner will be energized and the appropriate computer port and relay are assigned to the energized component. Assurance that the 24 V AC line is connected to T1 is provided at the time the P2 port is to be assigned (after the P1 port has been assigned). If none of the components are energized after the P1 port has been assigned, the system recognizes that the 24 V AC line has been connected to T2 rather than T1 and requires the installer to exchange these two wires. The system then proceeds to determine which components are connected to T3 and T4, in response to the installer's key entry, and assigns the computer output ports appropriately.

FIVE-WIRE INSTALLATION

A typical five-wire heating/cooling system is illustrated schematically in FIG. 3 to which specific reference is now made. Primary power is applied across primary winding 31 of transformer 30 and is stepped down to 24 volts at each of two separate and isolated secondary windings 32 and 33. Secondary winding 32 is associated with the furnace and fan and has one side thereof designated 24 V AC(FAN/FURNACE). The other side of winding 32 is connected to one side of the relay coils in each of the fan control relay 34 and furnace control relay 35. The other side of the fan control relay coil is the system FAN line; the other side of the furnace control relay coil is the system FURNACE line.

Secondary winding 33 is dedicated to the air conditioner and has one side thereof dedicated 24 V AC-(A/C) and the other side thereof connected to the relay coil in the air conditioner control relay 36. The other side of the air conditioner control relay coil is designated A/C.

For installation of the thermostat in a five-wire system, switch 17 (FIG. 1) is switched to connect T5 to one side of the contact for solid state relay 16, thereby isolating that relay contact from the others. This is consistent with the isolation provided between the air conditioner relay 36 and the other two relays 34, 35 by virtue of the separate secondary windings 33 and 32. It will be appreciated that installation of the thermostat in a five-wire system faces one problem which is not present in the four-wire system. Specifically, it is possible that the 24 V AC(FAN/FURNACE) line might be short-circuited to the separate 24 V AC(A/C) line if these two lines are connected to the same relay 14, 15 or 16 and if that relay is energized. Since the wires are not labeled, the possibility of this improper connection is not remote. Moreover, other undesirable connection combinations may be made, resulting in improper indications and operations of the system. Consequentially, a special lamp circuit, illustrated in FIG. 4, is employed for the five-wire system installation procedure. This lamp circuit includes a resistor 40 and an indicator lamp 41 connected in series between two terminals X and Y. Lamp 41 is typically a 12 volt (AC) lamp, and resistor 40 has a typical resistance of about three hundred fifty ohms. This lamp circuit permits connections to be checked before the relays 14, 15 and 16 are energized, thereby preventing improper and potentially dangerous connections.

Figure 6:
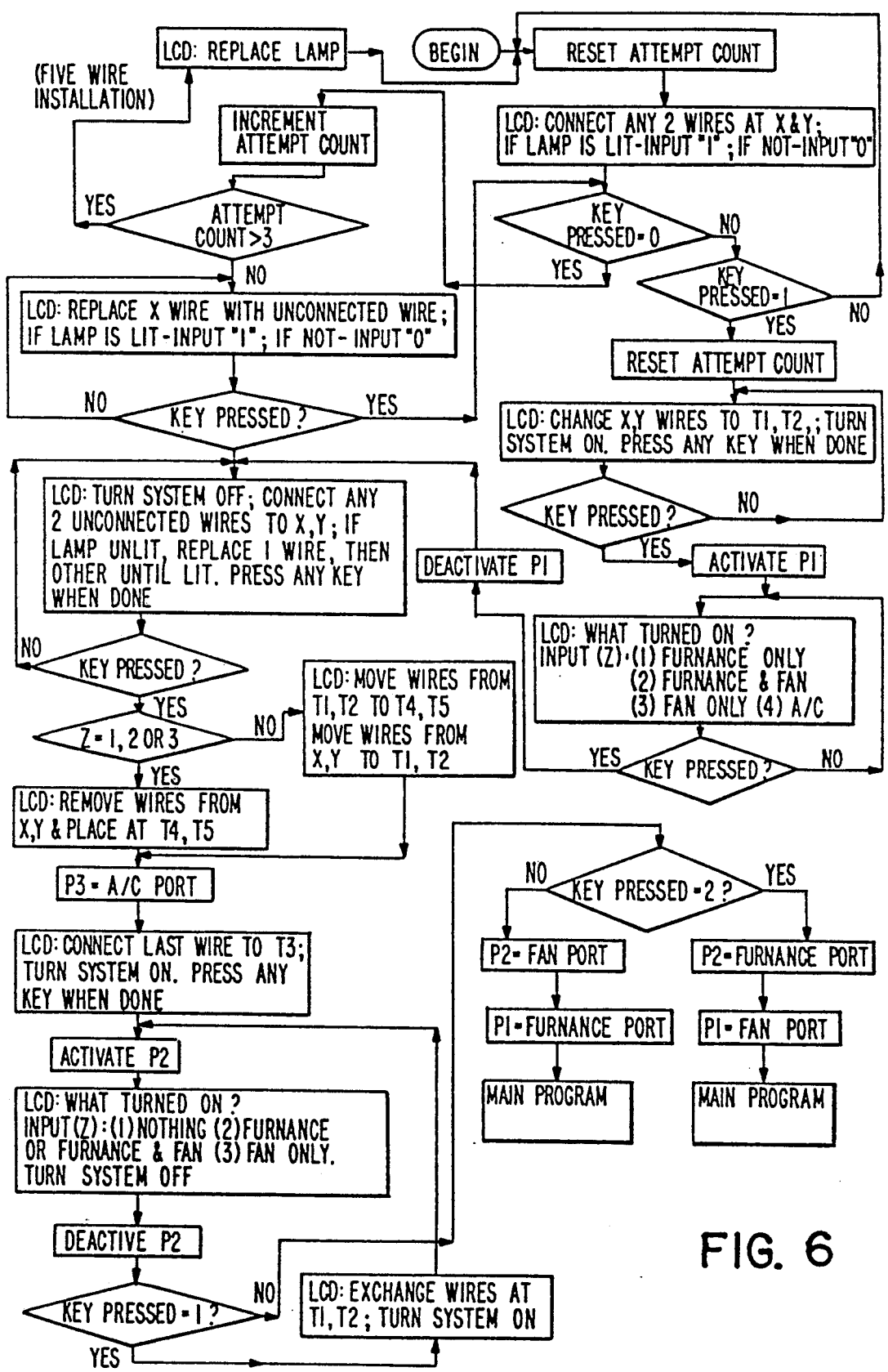
FIG. 6 illustrates the program routine for interaction with the system user to instruct proper connection of the thermostat to a five-wire HVAC system such as illustrated in FIG. 4.

The five-wire installation procedure is controlled by software represented by the flowchart illustrated in FIG. 6 to which specific reference is now made. After the Attempt Count parameter (to be described in detail below) is reset, the installer is instructed, in English at display 11, to connect any two of the five system wires (from FIG. 3) across the lamp circuit at terminals X and Y. If lamp 41 lights, it is an indication that one of the connected wires is either the 24 V AC fan/furnace line of the 24 V AC(A/C) line while the other connected wire is the FAN, FURNACE or A/C line. More particularly, if both connected wires are 24 V AC lines from the two transformers, there is no voltage drop across or current path through the lamp and it will not light. Two connected control lines (FAN, FURNACE and A/C) yield the same result. When there is a voltage drop across the lamp, the lamp lights in spite of the fact that none of relays 34, 35 or 36 is energized because the drop across the lamp acts as a voltage divider preventing the entire twenty-four volts from energizing these relays. Assuming for the present that lamp 41 is not lighted by the two connected wires, the installer is instructed to enter a "0" character via keypad 12. This is detected by the system which then proceeds to increment the Attempt Count parameter and, if the Attempt Count is not greater than three, the system displays a further prompt for the installer. The Attempt Count is used to keep track of the number of times that the installer connects a different pair of the five system wires across the lamp circuit. If more than three connection attempts are made without lighting lamp 41, the system directs the installer to replace the lamp which is assumed to be defective.

Assuming that the Attempt Count parameter is not greater than three, the display prompt instructs the installer to replace the wire connected at terminal X of the lamp circuit with one of the yet unconnected wires. A further prompt instructs the installer to enter a "1", if the lamp lights, or a "0", if it does not light. This procedure continues until the lamp 41 is lighted by the two wires connected to terminals X and Y.

Upon sensing that the key pressed by the installer is not "0", a check is made to be sure that the pressed key is a "1". If any other character was entered, an entry error exists and the system starts the installation procedure over again from the beginning. (Note—although not necessarily described and illustrated in conjunction with other software routines described herein, this return to the beginning of a routine may be incorporated after each character entry if an unacceptable character has been entered by the installer/operator).

If the entered character is a "1", the Attempt Count is reset and the system proceeds with a determination of which lines are connected across the lamp circuit. As part of this procedure the installer is instructed to remove the wires from terminals X and Y and place them at T2 and T1 and, when this is done, to turn the system on. The entry of any character by the installer from keypad 12 signifies that the installer has followed the instructions. (Note—although not necessarily specified in other software routines described herein, this technique of requiring entry of any character to acknowledge completion of a required task may be utilized throughout the system).

Computer output port P1 is actuated after the system has been turned on and an operative pair of wires have been connected to T1, T2. The installer is then prompted to enter a "1" if only the furnace is energized, a "2" if the furnace and fan are both energized, a "3" if only the fan is energized, or a "4" if the air conditioner is energized. A system parameter Z is assigned the value of the pressed key. Once the key is pressed and the value of Z assigned, the installer is instructed to connect any of the two remaining unconnected wires across the lamp circuit at terminals X and Y. If the two wires connected across the lamp circuit do not cause the lamp to light, the installer is instructed to replace one of these wires and then the other with unconnected wires until the lamp is lit. When two of the remaining three wires cause the lamp to light, the installer is instructed to so indicate by pressing any key. At this point the system determines whether or not the parameter Z, as entered by the installer when the system is turned on, is equal to one, two or three. If this is in fact the case, then the pair of wires presently connected across the lamp circuit must be the 24 V AC (A/C) and A/C lines. This is true, because if Z is equal to one, two or three, either the furnace only, the furnace and fan, or the fan only were energized when the system was turned on the air conditioner was not energized by the two wires connected at T1 and T2. In order for the two wires connected across the lamp circuit at X and Y to cause lamp 41 to light, therefore, these two wires must be the two wires associated with the air conditioner control. Consequently, the air conditioner control lines connected across the lamp circuit should be connected to solid state relay 16 at T4 and T5, and the installer is so instructed if it is determined that the parameter Z is equal to one, two or three. The computer then assigns port P3 as the air conditioner port and relay 16 as the air conditioner control relay. On the other hand, if the parameter Z is equal to four, the installer is instructed to remove the two wires connected at T1, T2 and place them at T4, T5. The reason for this is that if the installer entered the character "4" signifying that the air conditioner was energized when the system was turned on, then the two wires connected at T1, T2 are the 24 V AC(A/C) and A/C lines. The installer is also instructed to move the wires across the lamp circuit at terminals X and Y to T1, T2. Port P3 is assigned as the air conditioner port.

After assignment of port P3 as the air conditioner port, the installer is prompted to connect the remaining unconnected wire to T3, and to turn the system on. After this has been done the computer output port P2 is activated and the installer is requested to enter a character indicating which, if any, of the components became energized by energization of relay 15. This entered character, the value of which is assigned as the new value of the parameter Z, is a "1" if nothing was energized, a "2" if the furnace only or furnace and fan are energized, and a "3" if the fan only is energized. The installer is also instructed to turn the system off at this point in time. If a "1" is entered, signifying that nothing was energized by relay 15, the installer is instructed to interchange the wires connected to T1 and T2 and to turn the system on. The software then loops back to the point where port P2 is activated and the installer is once again requested to enter a character indicating which component was energized. If a "2" is entered, the system recognizes that the FURNACE line is connected at T3 and acts accordingly by assigning computer port P2 as the furnace port and relay 15 as the furnace control relay. This leaves port P1 as the only unassigned port which must, under the circumstances, be the fan port. Accordingly, the fan port function is assigned to P1 and relay 14 is assigned to function of controlling the fan.

If the installer enters a "3", indicating that only the fan has been energized in response to activation of port P2, this port is then assigned as the fan port and P1 is assigned the furnace function. In either case, after all of the three computer ports have been assigned a function, the software switches to the Main Program routine such as described in our aforementioned U.S. Pat. No. 4,725,001, or to an appropriate point in the program of any other set back or set forward electronic thermostat.

The foregoing installation procedures for the thermostat in either a four-wire or five-wire system are virtually foolproof in that they prompt the installer, who need not be particularly trained, to make appropriate connections until the correct connection for the system wiring is completed. The correct connection is readily achieved in a short period of time in spite of the fact that the four or five system wires are not labeled as to function.

BOILER INSTALLATION

A boiler typically is a two-wire system; that is, temperature control is effected from the thermostat by two wires to turn the boiler on and off. The cycling system disclosed in our U.S. Pat. No. 4,725,001 cannot efficiently operate with all commercially available boiler systems. For example, in a boiler system in which the liquid is continuously maintained at or near the normal system heating temperature (e.g., in order to have hot water available for fast response to heating demands), cycling below any temperature lower than that normal temperature is not possible; that is, the constant water temperature will control the boiler, not the space heating demand sensed by the thermostat. Under such circumstances it is desirable for the interactive thermostat to inform the homeowner/operator that the pre-existing system is not compatible with the thermostat being installed. Accordingly, the boiler installation procedure described below incorporates the incompatibility indication feature. It will be appreciated, of course, that this feature is not limited to the cycling control thermostat described in our aforesaid patent; rather, it is applicable to any thermostat that may not be compatible or operationally advantageous when used with particular heating/cooling systems.

Figure 7:
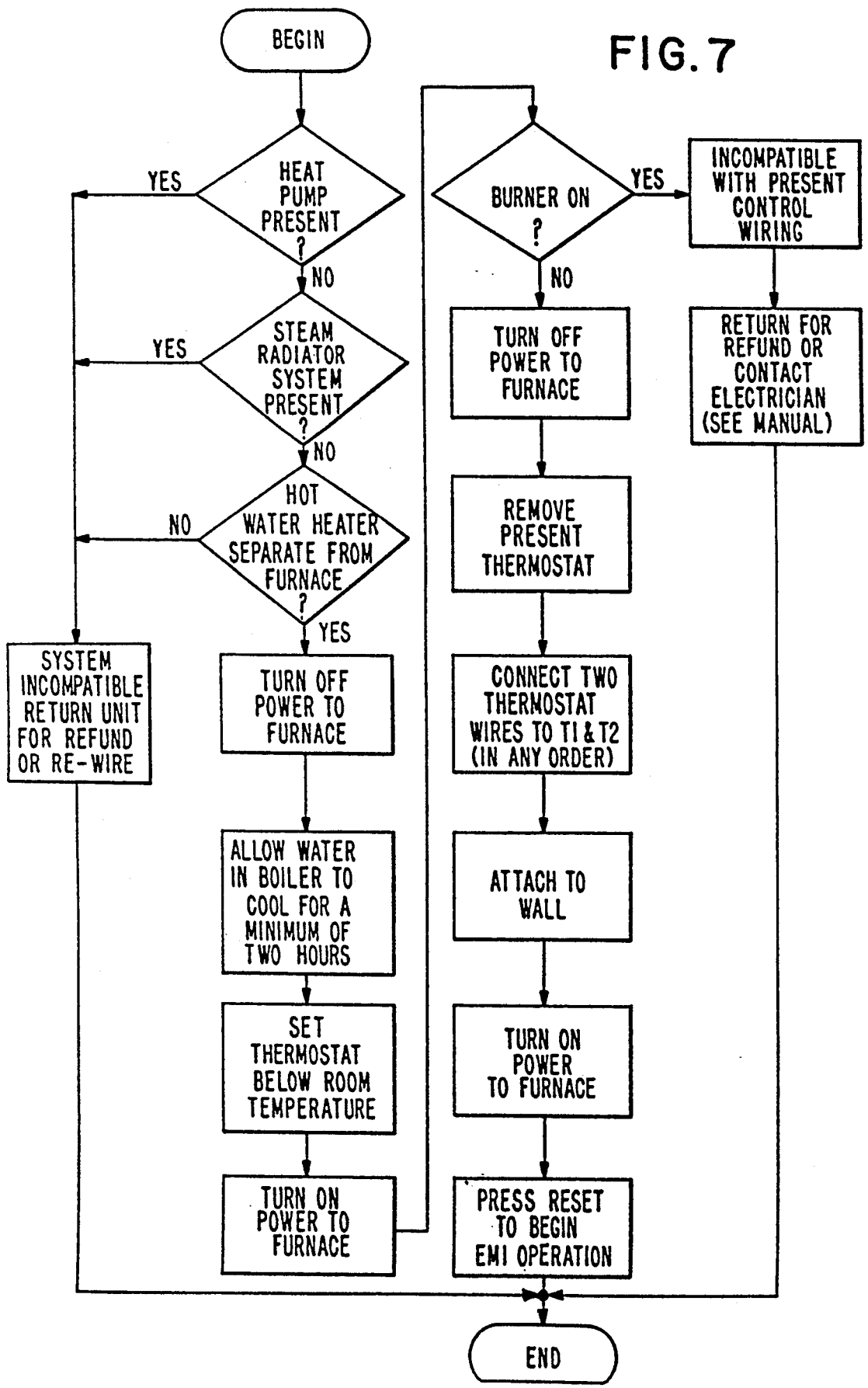
FIG. 7 illustrates the program routine for determining whether or not a pre-existing HVAC system is compatible with the thermostat being installed.

Referring now to the program routine flowchart illustrated in FIG. 7, the routine begins by the computer asking the homeowner, via display 11 (FIG. 1) whether or not the heating/cooling system includes a heat pump. If so, the operator enters a "1" at keypad 12 and the microprocessor 10 responds by providing a message at display 11 indicating that the heating/cooling system is incompatible and instructing the homeowner to rewire the system or return the thermostat for a refund. If the homeowner enters a "0", the microprocessor responds by asking whether or not a steam radiator system is present. If the homeowner answers in the positive (i.e., with a "1" entered at keypad 12), the system incompatible message is displayed. If the system is not of the steam radiator type, the homeowner's negative answer causes the software to inquire as to whether or not a hot water heater is employed separate from the furnace. If not, the system incompatibility message is displayed. It the system incompatibility message is displayed at any time, the program is terminated.

If the hot water heater is separate from the furnace, the positive response from the homeowner causes the microprocessor to instruct the homeowner to remove power from the furnace if such power has not been previously removed, and the homeowner is required to indicate that this has been done by depressing an appropriate key at keypad 12. Thereafter the microprocessor displays an instruction requiring that the water in the boiler be allowed to cool for a minimum of two hours. The response to this may either be an entry at the keypad by the homeowner after the appropriate amount of time has elapsed, or an automatic timed sequence initiated by the microprocessor to assure that the minimum two hour interval has elapsed. In either case, the operator is then instructed to set the thermostat to a temperature below room temperature and then to apply power to the furnace; the operator is required to acknowledge completion of each of these tasks by depression of an appropriate key at the keypad 12. At this point in the program the operator is requested to indicate whether or not the burner is on by depressing a "1" for a positive response and a "0" for a negative response. The purpose of these last few steps in the program is to determine if the circuitry controlling the heating/cooling system are compatible with the thermostat control system described in our aforementioned U.S. Pat. No. 4,725,001. In particular, the test determines whether or not the thermostat in the system controls both the burner and circulator pump, or only the circulator pump. If there is internal temperature control (e.g., an immersion control, etc.), the automatic thermostat described in our aforementioned patent cannot cycle the water temperature in the system. If the thermostat does not control the burner, the operator may return the unit for a refund or rewire the system to render it compatible (i.e., so that the thermostat controls both the burner and the circulator pump). Thus, if the burner becomes energized when power is applied to the furnace, it is clear that something other than the thermostat is in control. If the burner is not on, the thermostat controls the burner and the system is compatible.

Assuming the system to be compatible, the operator is instructed to remove power from the furnace and then remove the old thermostat from the system. After this has been done, as indicated by appropriate entry from keypad 12, the wire connection portion of the program begins. Since the thermostat in a boiler system has only two wires connected thereto, the user is instructed to connect the two thermostat wires to terminals T1 and T2, in any order, at microprocessor 10. Under such circumstances the solid state relay 14 is assigned to control boiler operation in accordance with the temperature sensed by the thermostat. The operator is then instructed to attach the new thermostat to the wall, apply power to the furnace and then press the reset button at the keypad to initiate the main program operation.

AUTOMATIC CONNECTION

It is within the scope of the present invention to arrange the interactive thermostat such that it automatically adapts itself to any connections, made by the installer, of the HVAC system wires to the thermostat. In this regard reference is made to FIG. 8 of the accompanying drawings. The circuitry is similar to that illustrated in FIG. 1 in that microprocessor 10 functions in the same manner with display 11, keypad 12, temperature sensor 13 and solid state relays 14, 15 and 16 connected to microprocessor output ports P1, P2 and P3, respectively. An additional solid state relay 18 is provided in the circuit of FIG. 8 and is driven by the microprocessor output port P4. When the contacts of relay 18 are closed, solenoid 15 is energized and changes the position of each of the four-poles of the four-position solenoid-driven switch, the poles of which are designated 51, 52, 53 and 54.

Solid state relays 14, 15 and 16 have their contacts connected to four lines A, B, C and D such that line A is connected to one contact of each of the relays while lines B, C and D are connected to the other contact at respective relays 14, 15 and 16. The four positions of the switch poles 51, 52, 53 and 54 are connected, via lines A, B, C and D, to different contacts of relays 14, 15 and 16, depending upon the position of the solenoid-driven switch. The common terminal at each switch pole 51, 52, 53 and 54 is connected to a respective thermostat terminal T1, T2, T3 and T4. Thus, the thermostat terminals are controllably connected to different contacts of relays 14, 15 and 16 via lines A, B, C and D in accordance with the position of the solenoid-driven switch. Table I is a chart showing the line (i.e., A, B, C and D) to which each thermostat terminal (T1, T2, T3, T4) is connected for each switch position.

TABLE I

| Switch Position | T1 | T2 | T3 | T4 |
|---|---|---|---|---|
| 1 | A | B | C | D |
| 2 | B | C | D | A |
| 3 | C | D | A | B |
| 4 | D | A | B | C |

Figure 8:
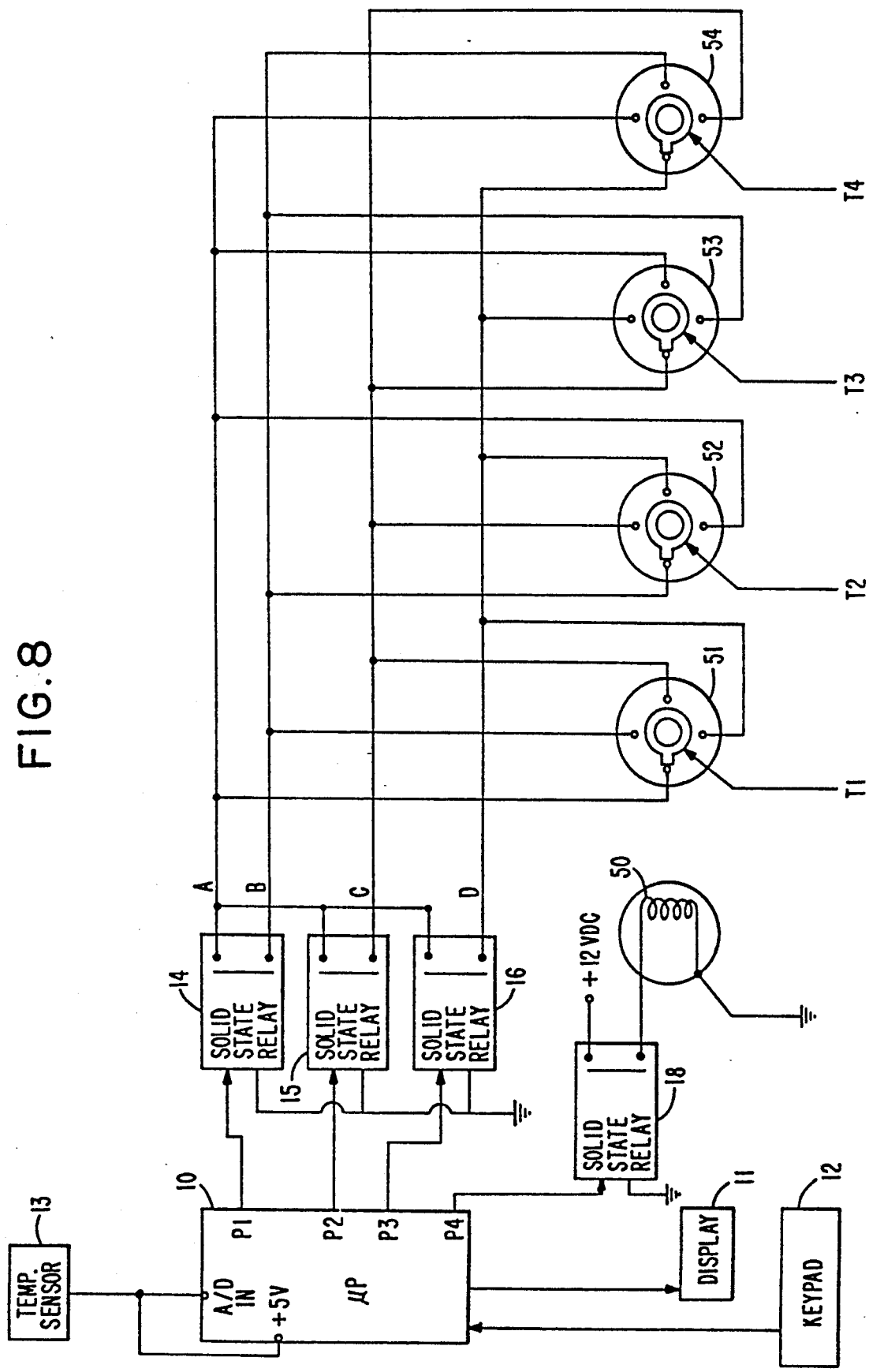
FIG. 8 is a schematic circuit diagram of an alternative embodiment of an interactive electronic thermostat according to the present invention wherein thermostat control circuits are automatically assigned to the proper wires from the HVAC system irrespective of the thermostat terminals to which the wires are connected.

In use, when the thermostat of FIG. 8 is installed, the installer may connect the four HVAC system lines (see FIG. 2) to any of the thermostat terminals T1, T2, T3 and T4. Depending upon the installer's response to certain prompts and queries originating at microprocessor 10 and displayed at display 11, the microprocessor drives solenoid 50 to different sequential positions until certain conditions are satisfied. The solenoid driven switch, therefore, permits the installer to connect each HVAC system wire only once; the computer automatically actuates the switch to achieve the proper connections. This operation is illustrated in the software flowchart of FIG. 9 to which specific reference is now made.

Figure 9:
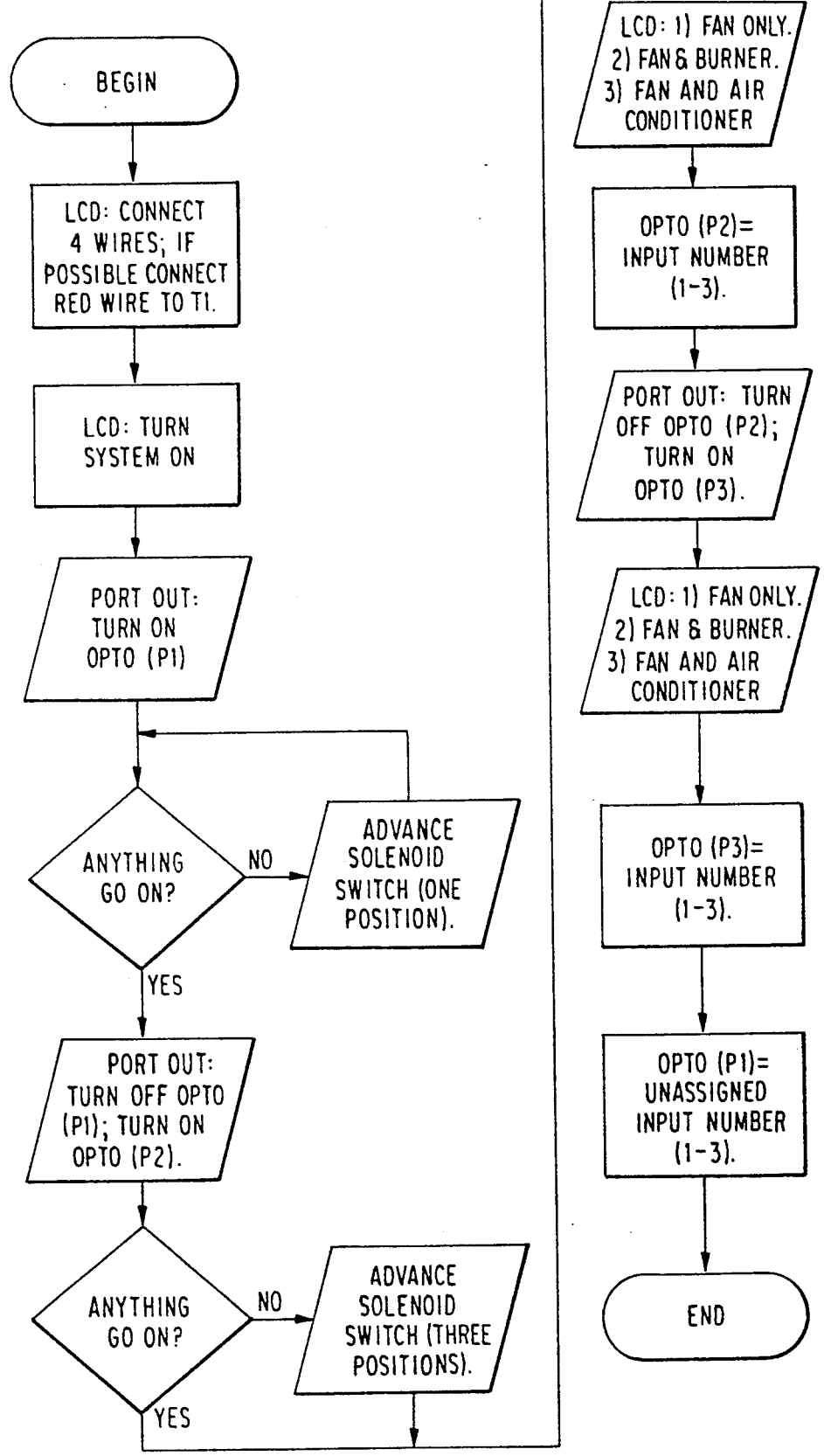
FIG. 9 illustrates the program for use with the circuit of FIG. 8 to automatically assign the thermostat control circuits to the HVAC system wires.

After entry into the four-wire installation routine illustrated in FIG. 9, the installer is instructed to connect all four wires to respective thermostat terminals T1, T2, T3 and T4 with the red wire being connected to terminal T1 if at all possible. Although not illustrated in FIG. 9, the installer is also instructed to press the zero key at the keypad after the wires have been connected. Thereafter the installer is instructed to turn the system on (i.e., apply power to the HVAC system). When this has been done, as signified by the 0 or other key being depressed at keypad 12, output port P1 of microprocessor 10 provides a signal to energize solid state relay 14. The installer is then requested to indicate, by depression of an appropriate key at keypad 12, whether or not any component (i.e., the fan, the furnace or the air conditioner) of the HVAC system was activated. It should be noted that, for the initial position of the solenoid-driven switch, thermostat terminals T1 and T2 are connected to lines A and B and therefore to the contacts of solid state relay 14. If the 24 V AC system line is connected to either of terminals T1 and T2, then one of the HVAC system components (i.e., the component for which the line is connected to the other of terminals T1 and T2) is energized at this time. The installer indicates by depression of an appropriate key whether or not a component is, in fact energized. If nothing is energized, the microprocessor provides an actuation signal at output port P4 to energize solid state relay 18 and thereby drive solenoid 50 to rotate the switch one position (i.e., position 2 wherein the movable contact at each of poles 51, 52, 53 and 54 is at twelve o'clock in the drawing). This routine repeats until such time as a system component is energized by the actuation of solid state relay 14, thereby indicating that one of lines A and B is connected to the 24 V AC system line. Once this has occurred the microprocessor 10 turns off output port P1 to de-energize solid state relay 14, and energizes output port P2 to actuate solid state relay 15. The installer is once again requested to indicate whether or not any of the system components has been energized. If a system component is energized at this time, then the 24 V AC line is properly connected to the A line and therefore to one contact of each of solid state relays 14, 15 and 16. On the other hand, if none of the system components are energized at this time, then the 24 V AC line is connected to the B line and, hence, only to solid state relay 14. Assuming the latter to be the case, the installer enters an indication, via keypad 12, that no component of the system has been energized. The microprocessor responds at output port P4 by causing solid state relay 18 to advance the solenoid-driven switch three positions. In this regard, it will be noted that each of the switch poles 51, 52, 53 and 54 is wired such that the position of the pole in which its assigned thermostat terminal is connected to line A is actually three clockwise positions removed from the position in which the pole interconnects its thermostat terminal with line B. Thus, for example, assume that the solenoid-driven switch is initially in position 3, its three-o'clock position, wherein thermostat terminal T4 is connected by switch pole 54 to line B and hence solid state relay 14. From the previous description we have determined that line B is connected to the 24 V AC system line which must, therefore, be connected to thermostat terminal T4. In order to properly apply the 24 V AC system line to all three of solid state relays 14, 15 and 16, then switch pole 54 must connect thermostat terminal T4 to the A line. This is achieved, as described, by causing the solenoid-driven switch to be rotated three clockwise positions, namely to position 2, the twelve o'clock position, wherein switch pole 54 connects thermostat terminal T4 to line A. On the other hand, if, upon actuation of solid state relay 15, one of the HVAC system components is energized, the microprocessor determines, from the installer response, that the 24 V AC line is properly connected to line A at each of the solid state relays 14, 15, 16.

Once the 24 V AC line is properly connected to line A, the microprocessor causes the display 11 to request the installer to actuate an appropriate key at keypad 12 in accordance with which of the system components has been energized. Thus, if only the fan has been energized, the installer is instructed to depress key 1; if the fan and the burner have been energized, the installer is requested to depress key 2; and if the fan and air conditioner have been energized, the installer is instructed to depress key 3. The thusly indicated energized system component is then assigned to solid state relay 15 and to microprocessor output port P2. The microprocessor then de-actuates solid state relay 15 at output port P2 and energizes solid state relay 16 at output port P3. The installer is once again requested to actuate an appropriate key at keypad 12 to indicate which of the system components has been energized. The appropriate function is assigned to solid state relay 16 and output port P3, and the remaining unassigned function is assigned to output port P1 and solid state relay 14. The program routine then ends with all of the HVAC system wires properly connected and identified at the computer ports.

It will be appreciated that the solenoid-driven four-pole switch may be replaced by a switching matrix. Alternatively, a manual thumbwheel switch, or the like, may be employed whereby the installer advances the switch positions, under computer instruction, until the HVAC system lines are properly connected. The manually-actuated switch is less expensive than a solenoid-driven switch and still permits a one-time only connection of the four system wires to thermostat terminals. This same approach described above for permitting one-time only connections in a four-wire system may also be employed for a five-wire system.

THERMOSTAT WITH IMPROVED AUTOMATIC MEANS AND AUXILIARY TEMPERATURE CONTROLLER

Figure 10:
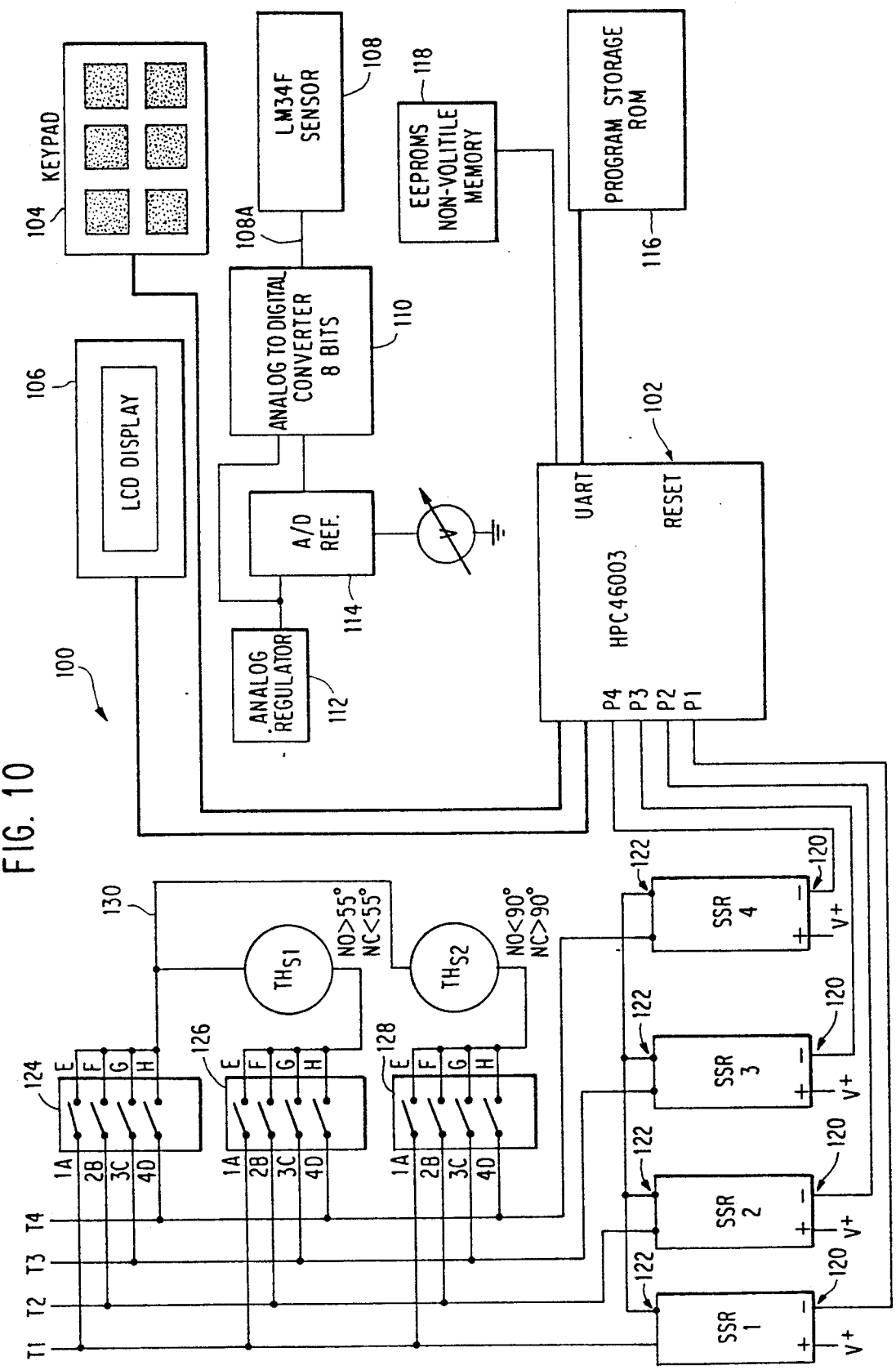
FIG. 10 is a schematic circuit diagram of another embodiment of an interactive electronic thermostat in accordance with the present invention which comprises improved means for automatically effecting proper connection between the thermostat and the HVAC system wires, and an auxiliary temperature control device.

FIG. 10 shows another embodiment of an electronic thermostat 100 in accordance with the present invention. In the embodiment of FIG. 10, thermostat 100 likewise comprises a microprocessor 102. For the embodiment of FIG. 10, a National Semi-Conductor model HPC46003 is preferred. A keypad 104 and an LCD display 106 likewise provide interface between the user and the microprocessor. The RESET pin of the microprocessor may be used to restart operation of the processor.

In the embodiment of FIG. 10, a sensor line 108A is provided for a sensor 108 which detects the temperature of the controlled environment. A preferred sensor is type LM34F by National Semi-Conductor Corporation. It is contemplated that a plurality of such sensors can be used with each sensor monitoring a different controlled environment. The sensor line 108A applies a temperature signal to an 8-bit A/D converter 110. A voltage controller serving as an analog regulator 112 provides an output to both an A/D reference unit 114 and the A/D converter 110. Control coding for the microprocessor 102 is stored in a ROM 116. An EEPROM memory unit 118 may be used as a backup. In a preferred embodiment of the present invention, all of the above-described components, with the exception of the LM34F sensor 108, are provided on an RTMC 05X0 board manufactured by CSys Labs.

Microprocessor 102 has four output ports referred to as ports P1, P2, P3, and P4. The output ports respectively are connected to solid state relays (SSR's) SSR1, SSR2, SSR3, and SSR4. The solid state relays SSR1 through SSR4 preferably comprise opto-isolators which are selectively energizable by the microprocessor 102. In the embodiment of FIG. 10, microprocessor ports P1 through P4 control the ground pin 120 of each of relays SSR1 through SSR4 to control the state of the relays. The plus (+) input of each relay is tied to high voltage. The contacts 122 of each of the relays SSR1 through SSR4 are commonly tied. The other contact of each relay is available for connection to a wire of the HVAC system and is referred to as one of terminals T1, T2, T3, or T4 respectively.

Figure 11A:
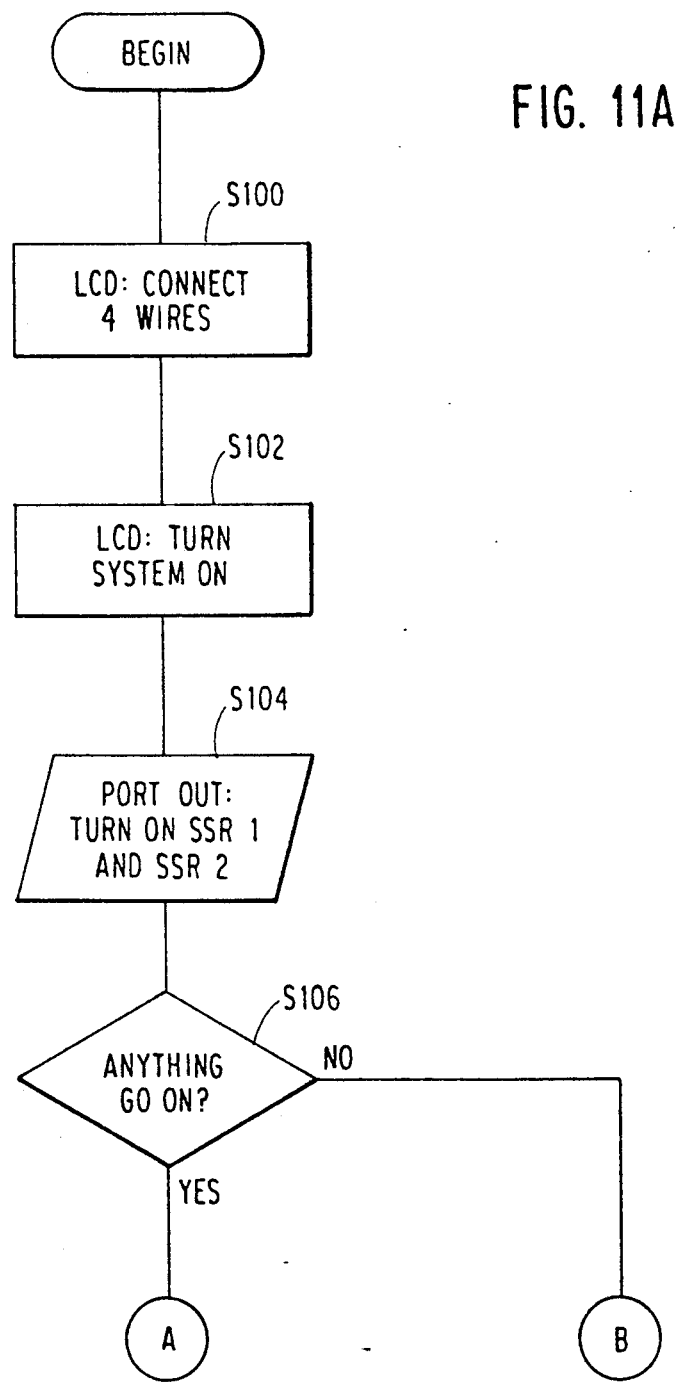
FIGS. 11A, 11B, and 11C provide a flow chart showing a routine for interaction with the system user to instruct proper connection of a thermostat such as illustrated in FIG. 10 to a HVAC system.
Figure 11B:
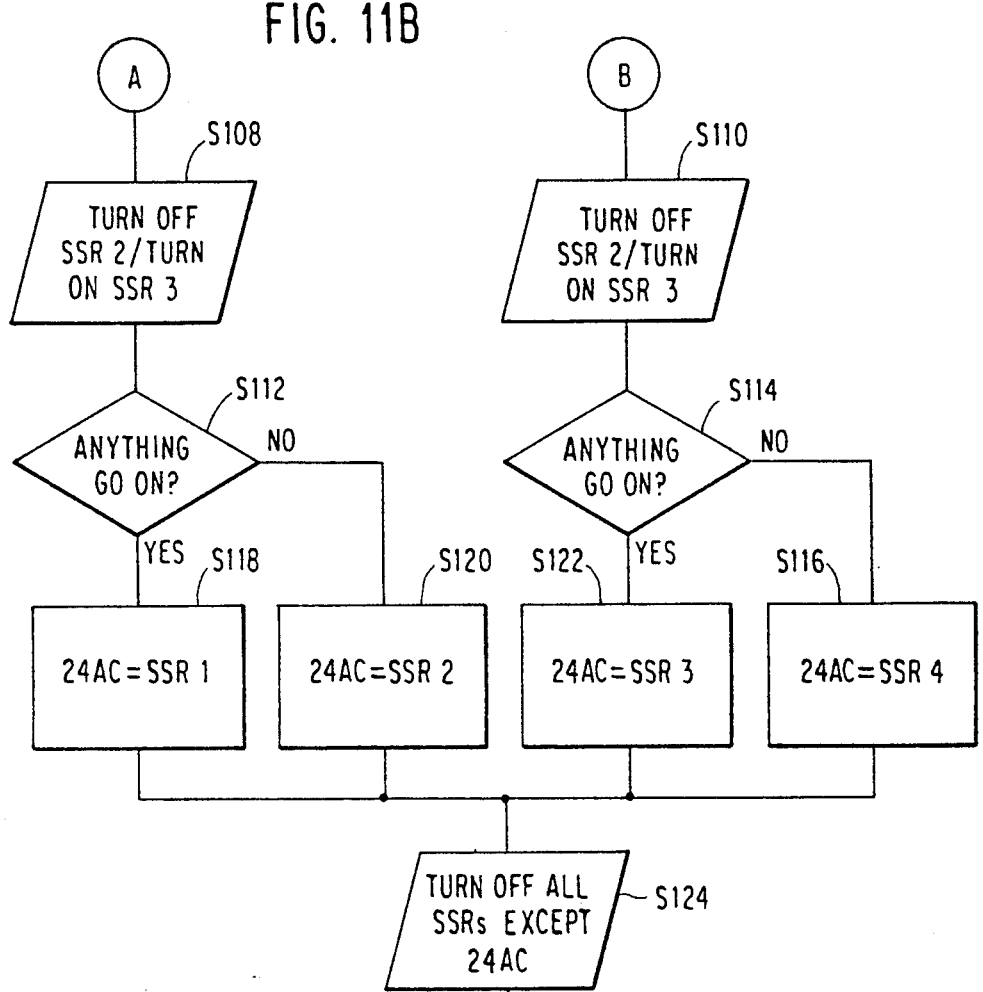
Figure 11C:
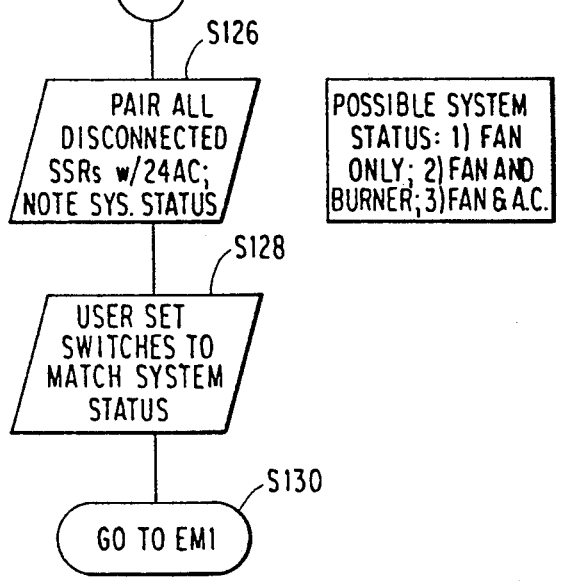

FIG. 11 is a simplified flow chart illustrating steps in the routine for connecting thermostat 100 to the wires of a four-wire HVAC system. After the system has been turned off, the installer is instructed to connect the four wires from the heating/cooling system to respective terminals T1 through T4 in step S-100. After all four wires have been connected, the installer is instructed to turn the system on in step S-102. Thereafter, in step S-104, thermostat 100 energizes solid state relays SSR1 and SSR2 by applying a low signal to their control pins 120. In step S-106, the installer is prompted to indicate, by depression of an appropriate key, what occurred in step S-104 by virtue of the system having been turned on and solid state relays SSR1 and SSR2 having been energized. With relays SSR1 and SSR2 energized, terminals T1 and T2 are shorted together. If one of the four lines connected to T1 or T2 is the 24 V AC line, the fan, the furnace or the air conditioner will be activated. Whether one of the fan, the furnace or air conditioner indeed was activated will be entered into memory. After entry into memory has been made of whether any of the fan, furnace or air conditioner turned on, advance is made to either of steps S-108 or S-110 wherein ports P1 and P3 are activated to actuate relays SSR1 and SSR3, respectively. In either of steps S-112 or S-114, the installer is asked to indicate what occurred as a result of energization of relays SSR1 and SSR3. With relays SSR1 and SSR3 energized, terminals T1 and T3 are shorted together. Again, if one of the four lines connected to T1 or T3 is the 24 V AC line, the fan, the furnace or the air conditioner would be activated by energizing relays SSR1, SSR3 since the other connected line would be the FAN, FURNACE, or A/C line.

If the installer indicates that there still is no response, then port P4 is initialized in step 8-116 as the 24 V AC control line. If the results of both of steps S-104 and S-108 were positive, i.e. one of the temperature-regulating devices, namely the fan, furnace or air-conditioner became actuated, then in step S-118, port P1 is assigned as the 24 V AC controlling port. If the result of step S-104 were positive but the result of step S-108 negative, advance would be made to step S-120 wherein port P2 is assigned as the 24 V control port. If the result of step S-104 was negative, while the result of step S-110 were positive, port P3 would be assigned as the 24 V AC control port in step S-122.

Once the controlling 24 V AC line has been identified, advance is made to step S-124 wherein all relays, except that assigned to the 24 V line, are deactivated. Then, in step S-126, each of the remaining relays is activated in a sequence. As each, as yet, unassigned relay is energized, the user is prompted to indicate which of the temperature-regulating devices are actuated by the relay energized. By the time step S-126 is completed, relays SSR1 through SSR4 will be associated with one of the temperature-regulating devices or the 24 V AC control line.

Preferred thermostat 100 has a safety backup feature for preventing uncontrolled temperature variations in the event that, for example, microprocessor 102 fails to operate properly. This safety system 132 acts as an auxiliary system to automatically activate the HVAC equipment when the temperature in the conditioned space reaches a maximum or minimum level. Preferred thermostat 100 thus comprises two thermostat elements THS1, THS2. The first element THS1 regulates the minimum temperature while the second, THS2, sets the maximum temperature of the safety temperature range. Three switch units 124, 126, 128 are provided for connecting thermostat elements THS1, THS2 to the HVAC lines. In the preferred embodiment, each of switch units 124, 126, 128 has individual, manually-operable switches, such as thumbnail switches, capable of connecting any of the control lines T1, T2, T3, T4 to either of the backup thermostat elements THS1, THS2. Each of switch units 124, 126, 128 has contacts 124A, 124B, 124C, 124D, 126A, 126B, 126C, 126D, 128A, 128B, 128C, 128D respectively connected to the control lines T1, T2, T3, and T4. The contacts 124E, 124F, 124G, 124H of switch unit 124 are commonly tied together, and tied to an input lead of each of the minimum temperature and maximum temperature thermostat elements THS1, THS2. The output lead from the minimum temperature thermostat element THS1 is commonly tied to the contacts 126E, 126F, 126G, 126H of the second switch unit 126. Likewise, the output lead from the maximum temperature thermostat element THS2 is commonly tied to each second contact 128E, 128F, 128G, 128H of the third switch unit 128.

With reference again to FIG. 11, Once relays SSR1 through SSR4 have been assigned, the installation of the safety backup system 130 follows. At the time the thermostat 100 assigned a control circuit to each of the HVAC devices, it thus memorized which control line corresponded to each of these devices. Then, when advance is made to step S-128, the installer simply is instructed as to which individual switch of the first switch unit 124 he is to close in order to connect the power supply control line to the input leads of thermostat elements THS1, THS2. There is no need for the installer to remember which of the individual switches of unit 124 need be operated because the correspondence between the individual switches and each of the now-assigned control lines previously has been memorized by microprocessor 102. The installer likewise is instructed to close the individual switch of the second switch unit 126 in order to connect the terminal assigned as the furnace control terminal to the output lead of the minimum temperature thermostat element THS1.

With element THS1 so connected, when the temperature reaches a minimum level, for example 55°, the minimum temperature thermostat element THS1 automatically activates the furnace by connecting the furnace and fan to the 24 volt AC supply line.

The installer further is instructed to close the appropriate individual switch of the third switch unit 128 to connect the identified air conditioner control line to the output lead of the maximum temperature thermostat element THS2. With element THS2 so connected, when the temperature in the conditioned area reaches a maximum level, for example 90°, the maximum temperature thermostat activates to electrically connect the air conditioner and the power supply line, thereby actuating the air conditioner.

This preferred embodiment including the backup safety system 130 provides flexibility in temperature regulation between a minimum temperature and a maximum temperature by choosing thermostat elements THS1, THS2 to provide any desired safety temperature range. The installer merely operates the necessary connecting switches 124A through 128D under instructions provided at the LCD display. It is understood that the switches 124A through 128D may opened rather than closed to configure the desired circuit, or alternatively, may be set by automatic means under installation control by microprocessor 102. Also, boiler installation is accomplished as described in our U.S. Pat. No. 5,065,813. The system likewise recognizes completion of the installation procedure and directs the program to the Main Program described in our U.S. Pat. No. 4,725,001, or to an appropriate point in other programs utilized in any other electronic set back or set forward thermostat.

From the foregoing it will be appreciated that the concept of the four-wire installation procedure is that different relay combinations ar energized and that the installer is required to inform the system as to which of the fan, furnace or air conditioner has been energized. By process of elimination, the program identifies the relay controlling the 24 V AC line. It then begins to activate the remaining relays. As each component is energized, the activated port is designated by the system as the port dedicated to the energized component, and the corresponding relay is assigned to control that component. When all of the relays have been so assigned, the installer is instructed to properly connect the auxiliary system by receiving instructions regarding which manual switch to operate. The foregoing installation procedures for the thermostat in a four-wire system are virtually foolproof in that they prompt the installer, who need not be particularly trained, in directing the controller to make appropriate connections until the correct connections for the system wiring is completed. The correct connections are readily achieved in a short period of time, whether or not the HVAC system wires have been labeled. Thus, it is contemplated that a homeowner, who is otherwise unfamiliar with thermostat system installation, could purchase an electronic thermostat in accordance with the present invention and perform installation as instructed by the inventive thermostat. It also is contemplated that local utility companies could send thermostat systems in accordance with the invention by post to their customers, or arrange to have vendors provide such systems to their customers to encourage the customers to conserve energy by using the inventive thermostat system which the customers can install themselves.

What is claimed is:

1. An electronic thermostat for controlling the operation of a temperature-modifying apparatus which is arranged to modify temperature within a conditioned space, the apparatus having at least two control wires to which said thermostat must be connected, said thermostat comprising:

data entry means for permitting manual entry of data into said system;

means for providing individual messages in a spoken language;

means for providing a sequence of prompts to instruct an installed to perform a procedure for providing electrical connections from the wires of said apparatus to points in said thermostat, and for requesting manual entry of response data via said data entry means to indicate the effect on the apparatus as certain of said steps are performed;

control means responsive to said response data for automatically structuring said thermostat for proper operation with the connections of the wires made by the installed, and for thereafter automatically modifying the temperature in the conditioned space;

auxiliary means for controlling said temperature-modifying apparatus to maintain the temperature in the conditioned space within a temperature range independently of said control means, said auxiliary means comprising thermostat means and connecting means which is configurable for connecting said thermostat means to the control wires of the temperature-modifying apparatus in accordance with said response data; and means for providing and memorizing a configuration of said connecting means based on said response data, said connecting means in said configuration connecting said thermostat means to the control wires for proper operation with the wire connections made by the installer between the apparatus and said electronic thermostat.

2. The thermostat according to claim 1, wherein said thermostat means comprises a first thermostat element for setting a minimum temperature of said range, and a second thermostat element for setting a maximum temperature thereof.

3. The thermostat according to claim 2, wherein said control means comprises switching means which comprise a solid state relay associated with each of said wires of the temperature-modifying apparatus, and a controller which controls conditions of said relays based upon said response data.

4. The thermostat according to claim 3 wherein the temperature-modifying apparatus has at least four wires and said switching means comprises at least four relays.

5. The thermostat according to claim 3 wherein each of said relays comprises a digital control pin connected to said controller, a first lead which is connected to said first lead of each of said other relays, and a second lead which is connectable to one of said control wires.

6. The thermostat according to claim 1, wherein said connecting means comprises manually operable switches and said means for providing a sequence of prompts further provides prompts instructing the installer to set said manually operable switches to connect said thermostat means to said control wires.

7. The thermostat according to claim 6, wherein said thermostat means comprises a first thermostat element for setting a minimum temperature of said range, and a second thermostat element for setting a maximum temperature thereof.

8. A method for effecting proper electrical connections between a plurality of wires of a temperature-modifying apparatus and a thermostat for controlling operation of said apparatus, said thermostat including temperature control means for modifying temperature within a conditioned space and auxiliary temperature control means for controlling the apparatus to maintain a temperature within a temperature range independently of said temperature control means, said auxiliary means comprising thermostat means and connecting means which is configurable for connecting said thermostat means to the control wires of the temperature-modifying apparatus, said method comprising the steps:

providing an instructional prompt in a commonly spoken language to instruct an installed to electrically connect said plurality of wires of said apparatus to points in said thermostat;

instructing said installer to enter data indicative of installer-observed responses to said apparatus;

receiving said installer-observed responses data and automatically configuring said thermostat for proper operation with connections of said wires to said thermostat points made by said installer based upon said entered installer-observed responses data; and providing another instructional prompt based upon said entered install-observed responses data to instruct said installer for configuring of said connecting means for auxiliary control of said temperature-modifying apparatus by said auxiliary temperature control means.

9. The method according to claim 8, wherein
said thermostat means comprises a first thermostat element for defining a minimum temperature of said range, a second thermostat element for defining a maximum temperature of said range, each of said thermostat elements having a power input and an output, and said connecting means comprises a set of first switches, a set of second switches, and a set of third switches, and wherein said step of automatically configuring said thermostat comprises the steps of identifying a power supply line from among said wires of said apparatus, and identifying which of said wires is associated with control of a furnace unit, an air conditioner unit, and a fan unit of the apparatus, and wherein said step of providing another instructional prompt comprises the steps of:

instructing said installer to operate a switch of said set of first switches to connect said power inputs to said power supply line, instructing said installer to operate a switch of said set of second switches to connect an output of said first thermostat element to said wire identified as associated with control of said furnace unit, and instructing said installer to operate a switch of said set of third switches to connect an output of said second thermostat element to said wire identified as associated with control of said air conditioning unit.

10. The method according to claim 8 wherein said temperature-modifying apparatus is a forced air heating and air conditioning system and said plurality of wires thereof includes four wires, namely a supply wire, a fan wire, a furnace wire and an air conditioner wire, wherein said thermostat includes fourth thermostat terminals, T1, T2, T3 and T4, four control lines A, B, C and D, and actuable switching means for automatically changing connections between said terminals and said four wires, and wherein said method comprises the steps of:

(a) instructing said installer to connect said four wires to said four thermostat terminals without identifying which wires are to be connected to which thermostat terminals;

(b) instructing said installer to apply power to said apparatus;

(c) activating a first and a second control circuit between said control lines A and B and two of said wires;

(d) instructing said installer to indicate whether or not any part of said apparatus was actuated in response to step (c);

(e) activating said first and a third control circuit between said control lines A and C and two of said wires, and repeating step (d);

(f) i. in response to a positive indication in steps (d) and (e), assigning to said first control circuit the function of controlling said supply line, ii. in response to a positive indication in step (d) and a negative indication in step (e), assigning to said second control circuit the function of controlling said supply line, iii. in response to a negative indication in step (d) and a positive indication in step (e), assigning to said third control circuit the function of controlling said supply line, and iv. in response to a negative indication in both steps (d) and (e), assigning to a fourth control circuit the function of controlling said supply line, (g) ensuring that said control circuit assigned to said supply line in step (F) is activated and activating a remaining unassigned control circuit in conjunction with said control circuit assigned to said supply line;

(h) instructing said installer to indicate which of the following conditions is in effect at the apparatus following step (g): (1) fan unit on; (2) air conditioner unit on; and (3) furnace unit on;

(i) in response to entry of conditions (1), (2) or (3), at step (h), assigning to said remaining unassigned control circuit the function of controlling the unit designated by that entered condition; and (j) repeating steps (g), (h) and (i) until all of said control circuits have been assigned.

11. The method according to claim 8, wherein
said thermostat means comprises a thermostat element for defining a minimum temperature of said temperature range, said thermostat element having a power input and an output, and said connecting means comprises a set of switches and wherein said step of automatically configuring said thermostat comprises the steps of identifying a power supply line from among said wires of said apparatus, and identifying which of said wires is associated with control of a temperature-modifying device of the temperature-modifying apparatus, and wherein said step of providing another instructional prompt comprises the steps of:

instructing said installer to operate a switch of said set of switches to connect said power to said power supply line, and instructing said installer to operate another switch of said set of switches to connect an output of said thermostat element to said wire identified as associated with control of said temperature-modifying device.

* * * * *